United States Patent
Simon

(10) Patent No.: US 7,856,854 B2
(45) Date of Patent: Dec. 28, 2010

(54) APPLIANCE WITH A CONTROLLABLE PROTECTION DEVICE

(75) Inventor: Helmut Simon, Argenbühl (DE)

(73) Assignee: Diehl Ako Stiftung & Co. KG, Wangen (DE)

( * ) Notice: Subject to any disclaimer, the term of this patent is extended or adjusted under 35 U.S.C. 154(b) by 480 days.

(21) Appl. No.: 12/037,229

(22) Filed: Feb. 26, 2008

(65) Prior Publication Data
US 2008/0202170 A1    Aug. 28, 2008

(30) Foreign Application Priority Data
Feb. 26, 2007    (DE) .................. 10 2007 009 637
Aug. 10, 2007    (DE) .................. 10 2007 037 767

(51) Int. Cl.
*D06F 33/02* (2006.01)

(52) U.S. Cl. ........................... 68/12.17; 68/12.26

(58) Field of Classification Search ............. 68/12.16, 68/12.26
See application file for complete search history.

(56) References Cited

U.S. PATENT DOCUMENTS

| | | | |
|---|---|---|---|
| 3,388,566 A | | 6/1968 | Kaper et al. |
| 3,553,488 A | | 1/1971 | Darrow et al. |
| 4,316,079 A | * | 2/1982 | Schmitz .................. 219/413 |
| 4,583,007 A | * | 4/1986 | Paski ...................... 327/165 |
| 4,623,179 A | * | 11/1986 | Davis et al. ............. 292/201 |
| 5,216,909 A | * | 6/1993 | Armoogam .............. 70/278.7 |
| 5,823,017 A | * | 10/1998 | Hapke et al. ............ 68/12.26 |
| 5,879,036 A | * | 3/1999 | Moline et al. ............ 292/210 |
| 6,334,637 B1 | | 1/2002 | Chioffi | |

FOREIGN PATENT DOCUMENTS

| | | |
|---|---|---|
| DE | 1585850 | 11/1970 |
| DE | 2163449 | 7/1973 |
| DE | 119 61 083 A1 | 6/2000 |
| EP | 0 702 103 A1 | 3/1996 |
| GB | 2 128 283 A | 4/1984 |

OTHER PUBLICATIONS

WIPO 2007/065797 96/2007.*

* cited by examiner

*Primary Examiner*—Frankie L Stinson
(74) *Attorney, Agent, or Firm*—Laurence A. Greenberg; Werner H. Stemer; Ralph E. Locher

(57) ABSTRACT

An appliance with a hazardous device contains a first controller controlled by a first control element which, in turn, is controlled by a second controller by use of a first switching element. An electrically controllable protection device is provided and is controlled by a second control element, it is possible to deactivate the protection device. A storage capacitor is provided between the first and the second control element and supplies the second control element with energy for a control pulse and is charged by the first control element when the first controller is switched off and is discharged by the first switching element when the first controller is switched on. This circuit generates a safe control circuit. In the event of a possible hazardous state, either the first controller is no longer supplied with energy or the protection device cannot be deactivated, and so danger to a user is precluded.

12 Claims, 4 Drawing Sheets

APPLIANCE WITH A CONTROLLABLE PROTECTION DEVICE

CROSS-REFERENCE TO RELATED APPLICATIONS

This application claims the priority, under 35 U.S.C. §119, of German applications DE 10 2007 009 637.4, filed Feb. 26, 2007 and DE 10 2007 037 767.5, filed Aug. 10, 2007; the prior application is herewith incorporated by reference in its entirety.

BACKGROUND OF THE INVENTION

Field of the Invention

The invention relates to an appliance having a controllable protection device. The appliance further has a first controller controlled by a first control element which, in turn, is controlled by a second controller via a first switching element. The electrically controllable protection device is controlled by a second control element and it is possible to deactivate the electrically controllable protection device.

Appliances having a hazardous device are provided with a protection device, which is preferably electrically controllable, in order to prevent improper use. An appliance with a hazardous device may be, for example, a laundry treatment appliance. During operation of laundry treatment appliances, in particular washing machines, it is necessary to ensure that the door for loading the appliance can be opened only when this is possible without risk to the user. For example, a door must be prevented from being opened if there is (hot) water in the drum or if the drum is rotating at more than 60 rev/min.

A classic element which is used for locking the machine door is formed, for example, from a bimetal which is heated by a PTC pill, drives a locking cam and, at the same time, closes a contact when locking is successful. Energy is supplied to the power elements of the machine by the contact, that is to say only with the door securely locked. A door locking element of this type is clearly described, for example, in published, British patent application GB 2,128,283 A. If the door locking element is switched off, it releases the door only after a certain delay time has elapsed, on account of the thermal time constant of the bimetal and the PTC pill.

Furthermore, published, European patent application EP 0 702 103 A1, for example, discloses a laundry treatment appliance in which the door locking element and the drive motor are controlled by a common switch (for example a triac). By virtue of a circuit arrangement of this type, voltage is in each case applied to the door locking element when the drive motor is intentionally or unintentionally switched on, that is to say the door cannot be unlocked if the motor is activated.

In another type of door lock, the door either automatically locks mechanically or is actively locked by a control pulse when the door is closed. The lock can be deactivated or actively opened by a magnet of the door locking element without any inherent delay by control with short pulses, in order to unlock the loading door of the washing machine. Door locks of this type are usually controlled solely by electronics by use of switches because this provides greater freedom in terms of the program design of the laundry treatment. However, in the event of a short circuit in the control switch, the door would be permanently unlocked. In order to maintain security against impermissible opening of the door, the prior art, for example, proposes using two independent control circuits which are connected in series. However, this is costly in terms of the space required by the control circuit and is not cost-effective.

This problem can be remedied, for example, by configuring the door lock such that at least two pulses are necessary for unlocking purposes with only simple control. A door locking element of this type which operates with a toothed wheel and a catch is disclosed in published, non-prosecuted German patent application DE 199 61 083 A1. However, a state in which the controlling microcomputer generates the two control pulses which are required for opening purposes on account of faulty functioning is also critical in this solution. Another cause of two control pulses being generated can be provided by electromagnetic interference.

A solution to the last-mentioned problem involves linking the speedometer signal, which is emitted by the rotating motor, to a control circuit of the door locking element. This is done in such a way that the control pulses for opening the lock are prevented by hardware when the drum is rotating.

A control circuit for a laundry treatment appliance which is constructed as illustrated in FIG. 4 is also known.

The conventional control circuit of a laundry treatment appliance controls a motor controller 10 of a washing machine drum as an example of an electrically controllable, hazardous device. A supply voltage V1 of the motor controller 10 can be connected and disconnected by a microcontroller 14 via a relay 12 as a first control element. When the supply voltage V1 is disconnected, the hazardous state disappears immediately or after a certain time. The relay 12 is usually controlled by a transistor or similar switching element 16.

In order to protect the user of the washing machine against danger, for example by a rotating laundry drum, a door locking element (for example the magnetic closure of the washing machine door) 18 is provided as an electrically controllable protection device which can be deactivated. A second control element 20 which is in the form of a triac for example and receives trigger pulses by a transistor serves for control of the door locking element 18 by the microcontroller 14.

The two control elements 12, 20 of the motor controller 10 and of the door locking element 18 have an independent supply voltage. For this reason, the user of the washing machine may be exposed to danger if the door locking element 18 is disabled due to a fault in the second control element 20, a software fault of the microcontroller 14, electromagnetic interference or due to another event.

BRIEF SUMMARY OF THE INVENTION

It is accordingly an object of the invention to provide an appliance with a controllable protection device, that overcomes the above-mentioned disadvantages of the prior art devices of this general type, in which the functional reliability of the protection device is further increased.

With the foregoing and other objects in view there is provided, in accordance with the invention, an appliance having a hazardous device. The appliance contains a first control element, a first switching element connected to the first control element, a first controller connected to and controlled by the first control element, a second controller controlling the first controller via the first switching element, a second control element, an electrically controllable protection device connected to and controlled by the second control element, it being possible to deactivate the electrically controllable protection device, and a storage capacitor connected between the first and second control elements and supplying the second control element with energy for a control pulse. The storage capacitor is charged by the first control element when the first controller is switched off and is discharged by the first switching element when the first controller is switched on.

The appliance with the hazardous device contains the first controller which is controlled by a first control element which, in turn, is controlled by a controller via a first switching element, and an electrically controllable protection device which is controlled by a second control element, it being possible to deactivate the electrically controllable protection device. Furthermore, a storage capacitor is provided between the first and the second control element and supplies the second control element with energy for a control pulse and is charged by the first control element when the first controller is switched off and is discharged by the first switching element when the first controller is switched on.

In contrast to the control circuit illustrated in FIG. 4, the first and the second control elements for the first controller and the electrically controllable protection device do not have independent voltage supplies, but instead the energy which is required to deactivate the electrically controllable protection device is supplied from a storage capacitor which is connected between the first and the second control element. Since the storage capacitor is charged by the first switching element when the first controller is switched off and is discharged by the first control element when the first controller is switched on, energy for deactivating the electrically controllable protection device is only available in the storage capacitor when the first controller is switched off and there is therefore no longer any risk to the user. If, in contrast, the first controller is in operation, the electrically controllable protection device can no longer be deactivated because the storage capacitor is discharged. Any interruption in the connection line or a component leads to either it no longer being possible to supply the first controller with energy or it no longer being possible to deactivate the electrically controllable protection device. The inventive appliance with a hazardous device therefore has an inherently safe control circuit for the first controller and the electrically controllable protection device.

In a refinement of the invention, a charging resistor is connected between the storage capacitor and the first switching element, so that the storage capacitor is charged with a specific time delay. The time delay by the charging resistor is preferably configured such that the hazardous state is reliably stopped by the first controller.

In a further refinement of the invention, a series circuit containing a discharging resistor and a diode is connected between the storage capacitor and the first control element, so that the storage capacitor can be rapidly discharged by the discharging resistor when the first controller is switched on.

In an exemplary embodiment, the second control element is a triac which is triggered by the second controller with the energy of the storage capacitor by a second switching element. In an alternative exemplary embodiment, the second control element is a relay which is excited by the second controller with the energy of the storage capacitor by a second switching element.

In a still further refinement of the invention, the first control element and the first switching element are integrated in a separate module.

In a preferred alternative, the appliance is a laundry treatment appliance, in particular a washing machine. The hazardous device is expediently a driveable laundry drum. The first controller is advantageously a motor controller. The electrically controllable protection device is particularly advantageously a door locking element.

In a preferred alternative, the electrically controllable protection device can be deactivated by at least two control pulses. This ensures that the electrically controllable protection device can no longer be deactivated because at least two control pulses are required for deactivation purposes but the storage capacitor can only provide energy for one such control pulse if it is not recharged.

Other features which are considered as characteristic for the invention are set forth in the appended claims.

Although the invention is illustrated and described herein as embodied in an appliance with a controllable protection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
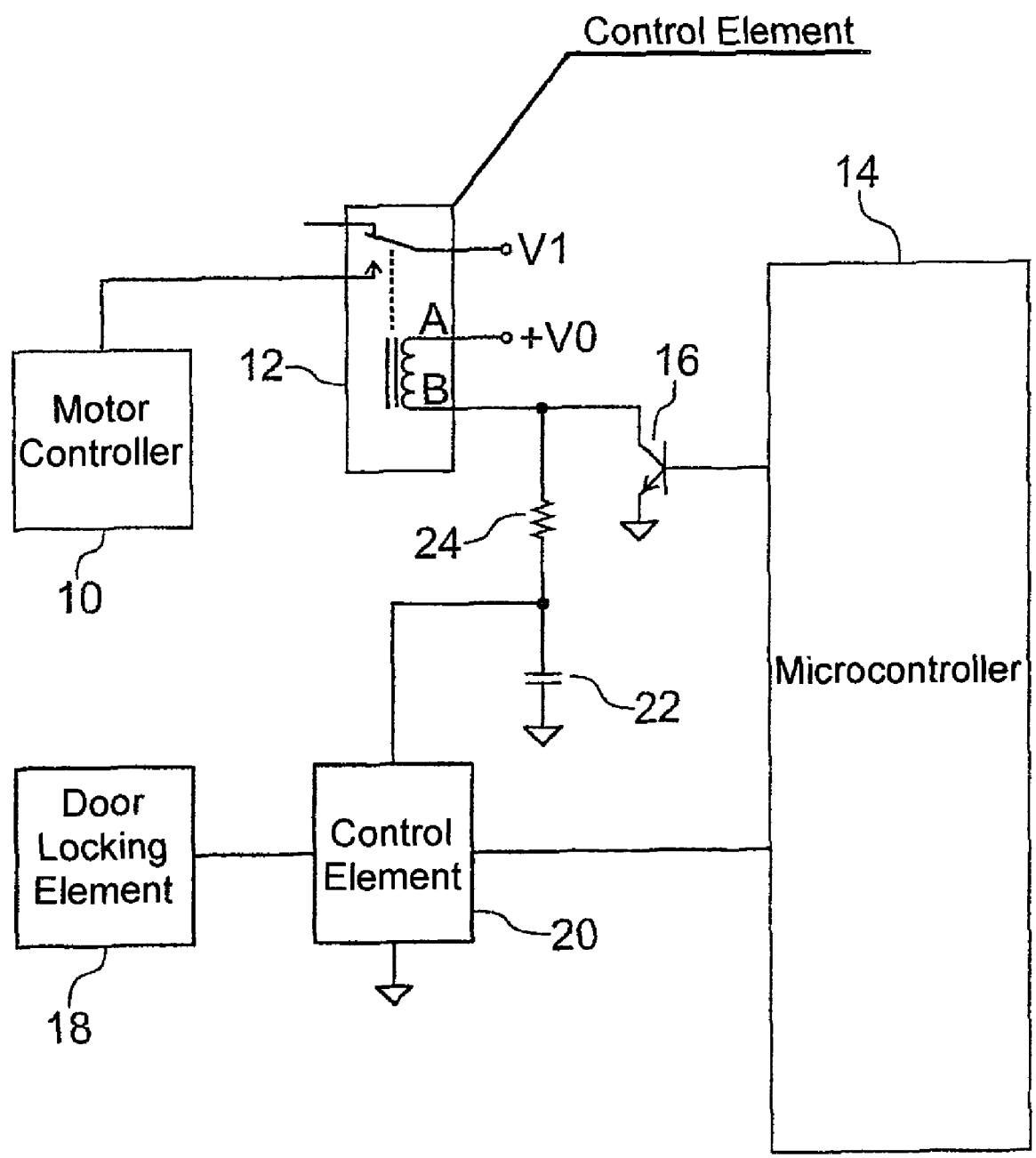
FIG. 1 is a schematic illustration of a control circuit according to a first exemplary embodiment of a laundry treatment appliance according to the invention.
Figure 4:
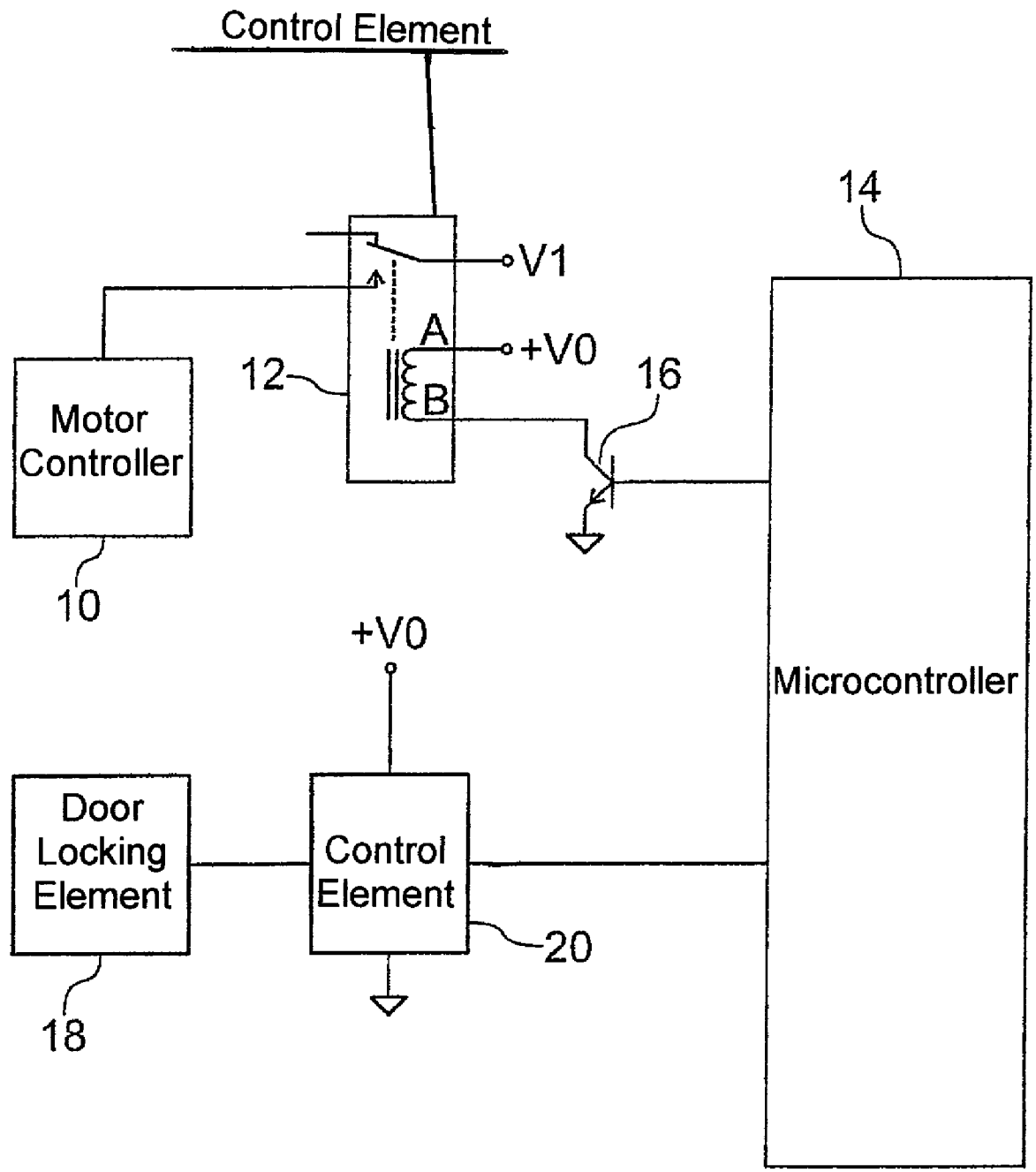
FIG. 4 is a schematic illustration of a conventional control circuit of a laundry treatment machine.

Referring now to the figures of the drawing in detail and first, particularly, to FIG. 1 thereof, there is shown a basic structure of a control circuit of a washing machine according to a first exemplary embodiment. In this case, identical and similar components to those in the conventional control circuit illustrated in FIG. 4 are provided with the same reference numerals.

A supply voltage V1 for a motor controller (for example frequency converter) 10 of the washing machine is supplied or interrupted by a first control element 12 in the form of a relay. For its part, the first control element 12 is controlled by a controller (for example microcontroller) 14 via a first switching element 16 in the form of a transistor, driver or similar switching element. If the supply of supply voltage V1 to the motor controller 10 is interrupted by the first control element 12, a hazardous state for the user created by the motor controller 10 disappears after a certain time T, for example the rotational speed of the laundry drum falls below a predetermined limit value.

In order to protect the user of the washing machine, a door locking element 18 is further provided which preferably automatically locks the door for loading the laundry drum and permits activation of the motor controller 10 only when the door is securely locked. A door locking element 18 is controlled by a controller 14 by use of a second control element 20, that is to say is deactivated as required, in order to unlock the door and therefore permit the door to be opened. In this case, at least two control pulses of the second control element 20 are required to deactivate the door locking element 18.

Energy is supplied to the second control element 20 in order to generate the control pulses for deactivation of the door locking element 18 by a storage capacitor 22 which is provided between the first and the second control element 12, 20. In this case, the storage capacitor 22 is connected to the first control element 12 by a charging resistor 24.

When the motor controller 10 is switched off, that is to say the first control element 12 interrupts the supply voltage V1 to the motor controller 10, the storage capacitor 22 is charged with the supply voltage V0 of the first control element 12 by the charging resistor 24. In this case, a time T1 required to charge the storage capacitor 22 is preferably longer than the above time T taken to reach the safe state after the motor controller 10 is switched off.

The storage capacitor 22 which is charged in this way provides the energy required by the second control element 20 to generate the control pulses, that is to say to deactivate the door locking element 18. In this case, the energy of the charged storage capacitor 22 is sufficient to generate a control pulse.

Figure 3:
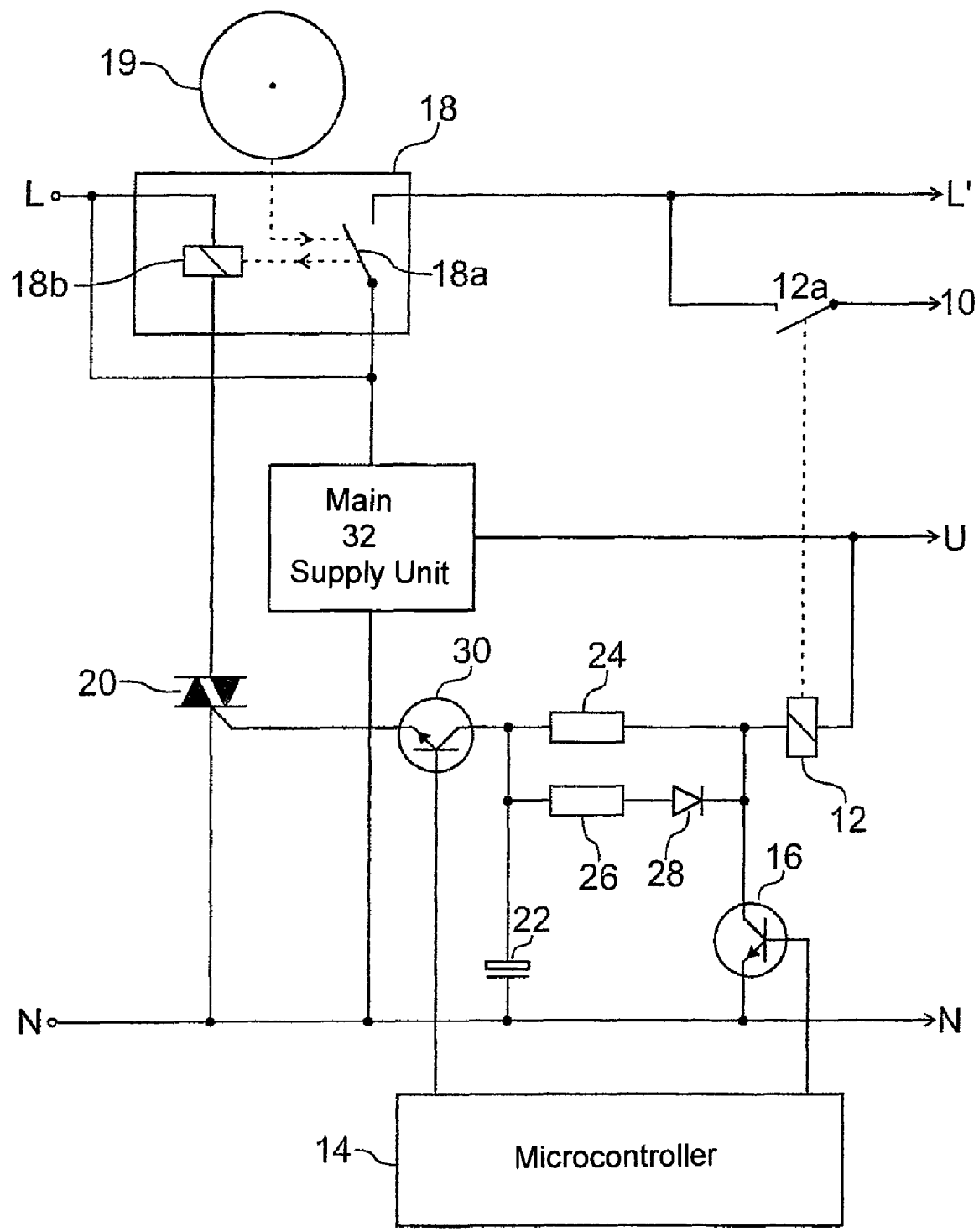
FIG. 3 is a schematic detailed illustration of the control circuit from FIG. 2.

The second control element 20 is, for example, a triac which is triggered by the controller 14 with the energy of the storage capacitor 22 by a second switching element 30, for example a transistor, see FIG. 3. Alternatively, the second control element 20 is a relay which is excited by the controller 14 with the energy of the storage capacitor 22 by the second switching element 30.

If the motor controller 10 is supplied with energy by the first control element 12, the first switching element 16 is turned on. In this state, the storage capacitor 22 is discharged by the discharging resistor 24 over a certain time. After a brief time period has elapsed, the door locking element 18 can no longer be deactivated because the storage capacitor 22 does not provide enough energy for the second control element 20 to generate a control pulse.

Furthermore, each interruption of a connection line or a component leads to either it no longer being possible to supply energy to the motor controller 10 or it no longer being possible to deactivate the door locking element 18 because no energy is available for this purpose. The same applies in the event of a short circuit of the transistor 16 or of the second control element 20, because the storage capacitor 22 only supplies the energy for one control pulse of the second switching element 20, but two such control pulses are required to deactivate the door locking element 18. In addition, faulty activation of the door locking element 18 by the controller or EMC interference which effects incorrect deactivation of the door locking element 18 can be avoided. This is also possible when no speedometer pulses of the motor are available for evaluation purposes.

The circuit arrangement illustrated in FIG. 1 therefore represents an inherently safe control circuit, since a hazardous state for a user is prevented in each case.

Figure 2:
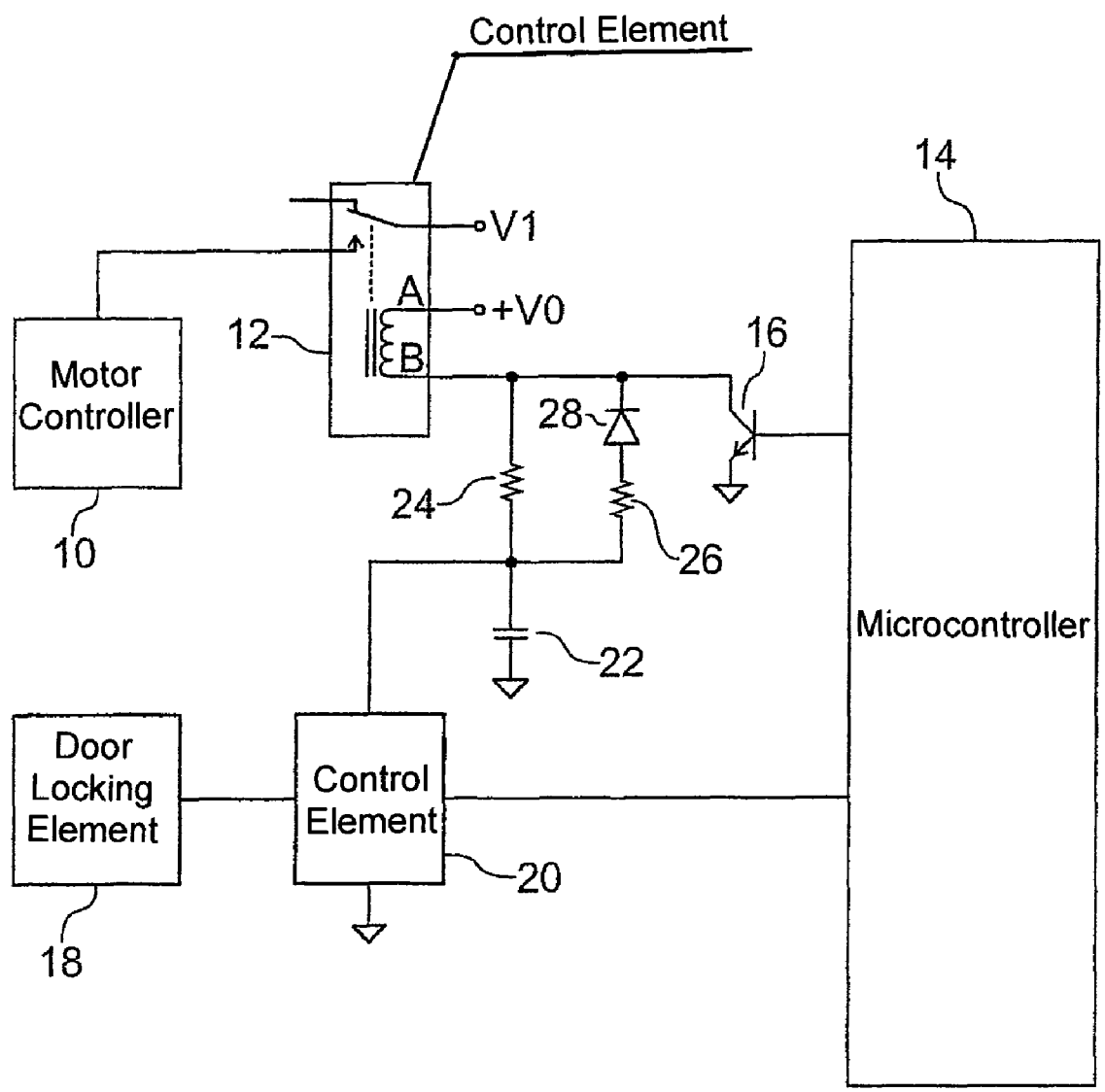
FIG. 2 is a schematic illustration of the control circuit according to a second exemplary embodiment of the laundry treatment appliance according to the invention.

A second exemplary embodiment of the control circuit for the washing machine will now be explained in greater detail with reference to FIGS. 2 and 3. In these cases, identical or similar components are assigned the same reference numerals and said components are not described again.

The second exemplary embodiment differs from the above first control circuit in that a series circuit containing a discharging resistor 26 and a diode 28 is connected in parallel with the charging resistor 24. This circuit configuration permits different times for the charging process and the discharging process of the storage capacitor.

When the supply voltage V1 is connected to the motor controller 10 by the first switching element 12, the storage capacitor 22 is, in this case, discharged by the discharging resistor 26 and the diode 28 with a time constant T2 which is shorter than the time constant T1 for the charging process of the storage capacitor 22 via the charging resistor 24. In this way, deactivation of the door locking element 18 is no longer possible even a very short time after the motor controller 10 is switched on. After the motor controller 10 is switched off, the door of the laundry drum can be deactivated only after a time T1 (>T).

The further features and advantages of the second control circuit are the same as those of the above-described first exemplary embodiment.

A detailed illustration of a control circuit of the above-described second exemplary embodiment is shown in FIG. 3.

The door locking element 18 automatically locks when a door 19 of the laundry drum is closed and, with a locking cam, operates a switch 18a. The mains connection L is then applied to the power elements of the washing machine by the switch 18a as L'. The motor controller 10 is switched on by the controller 14 by the switch 12a of the relay 12. In this state, that is to say when the motor and therefore the laundry drum are rotating, a voltage of 0 V is applied to the collector of the transistor 16 and the storage capacitor 22 is discharged by the discharging capacitor 26 and the diode 28.

The door locking element 18 also has a magnet 18b for magnetically tripping the switch 18a. The triac 20 which operates the magnet 18b can be triggered by a signal from the controller by the transistor (second switching element of the invention) 30 with the energy from the storage capacitor 22.

As soon as the controller 14 turns off the transistor 16, the relay 12 drops out and its switch 12a opens the connection to the motor controller 10. The voltage U, conducted by the relay winding of the relay 12, is then applied to the collector of the transistor 16 by the mains supply unit 32. The storage capacitor 22 is now charged by the charging resistor 24 with the corresponding time constant T1. The door 1 can now, that is to say in the currentless state of the motor controller 10, be unlocked by the controller 14 by the transistor 30, triac 20 and door locking element 18, with the transistor 30 drawing the energy which is required for triggering the triac 20 from the storage capacitor 22.

As soon as the motor controller 10 is connected to the voltage supply by the controller 14, again by use of the transistor 16 and the relay 12 with the switch 12a, the transistor 16 rapidly discharges the storage capacitor 22 via the discharging resistor 26 and the diode 28. It is then no longer possible to unlock the door 19.

The invention claimed is:

1. An appliance having a hazardous device, comprising:
   a first control element;
   a first switching element connected to said first control element;
   a first controller connected to and controlled by said first control element;
   a second controller controlling said first controller via said first switching element;
   a second control element;
   an electrically controllable protection device connected to and controlled by said second control element, it being possible to deactivate said electrically controllable protection device; and
   a storage capacitor connected between said first and second control elements and supplying said second control element with energy for a control pulse and is charged by said first control element when said first controller is switched off and is discharged by said first switching element when said first controller is switched on.

2. The appliance according to claim 1, further comprising a charging resistor connected between said storage capacitor and said first switching element.

3. The appliance according to claim 2, further comprising a series circuit containing a discharging resistor and a diode, said series circuit connected between said storage capacitor and said first control element.

4. The appliance according to claim 2, wherein said second control element is a triac triggered by said second controller with energy from said storage capacitor by said second switching element.

5. The appliance according to claim 2, wherein said second control element is a relay excited by said second controller with energy from said storage capacitor by said second switching element.

6. The appliance according to claim 1, wherein said first control element and said first switching element are integrated in a separate module.

7. The appliance according to claim 1, wherein the appliance is a laundry treatment appliance.

8. The appliance according to claim 1, wherein the hazardous device is a driveable laundry drum.

9. The appliance according to claim 1, wherein said first controller is a motor controller.

10. The appliance according to claim 1, wherein said electrically controllable protection device is a door locking element.

11. The appliance according to claim 1, wherein said electrically controllable protection device can be deactivated by at least two control pulses.

12. The appliance according to claim 1, wherein the appliance is a washing machine.

* * * * *